March 3, 1931.  A. G. KUPETZ  1,794,464
COMBINED TYPEWRITING AND COMPUTING MACHINE
Original Filed Oct. 2, 1925   2 Sheets-Sheet 1
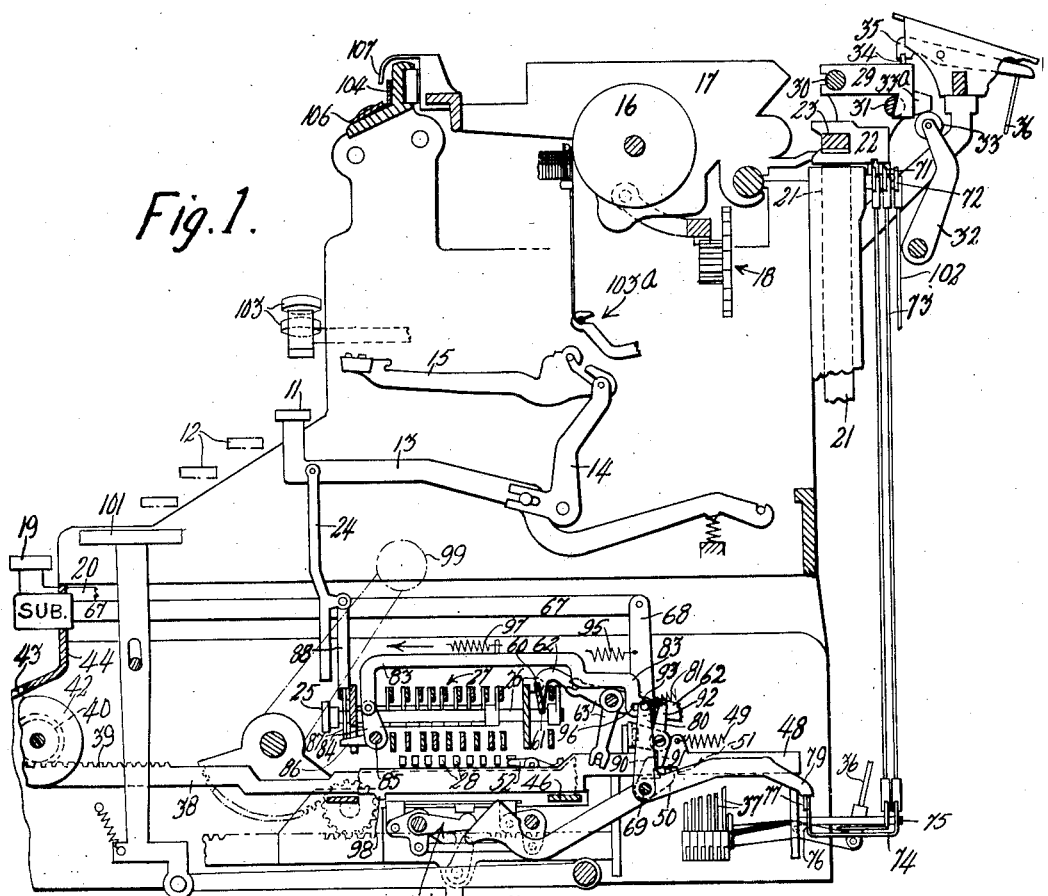
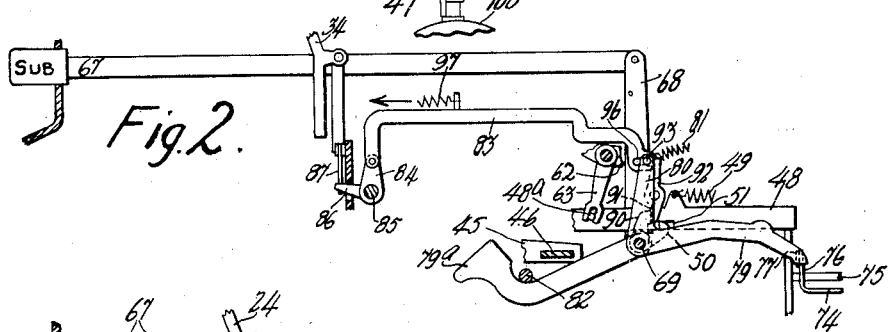
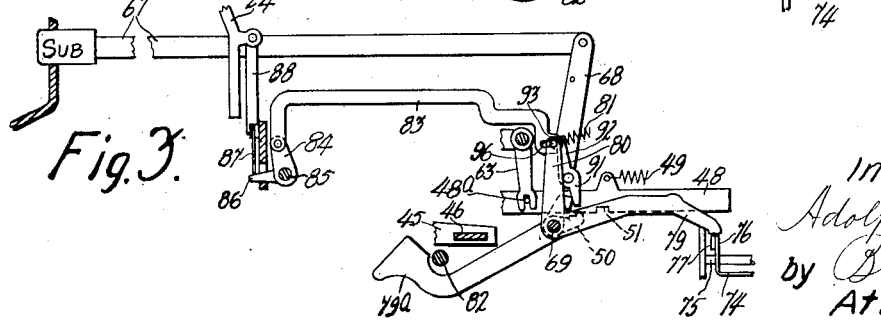
Inventor:
Adolph G. Kupetz
by B. C. Stickney
Attorney March 3, 1931.  A. G. KUPETZ  1,794,464
COMBINED TYPEWRITING AND COMPUTING MACHINE
Original Filed Oct. 2, 1925  2 Sheets-Sheet 2
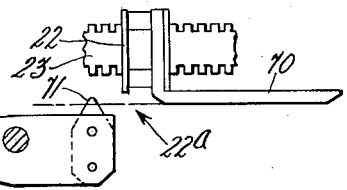
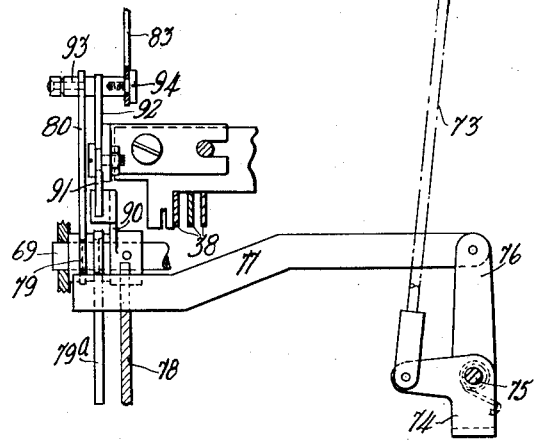
Fig. 4.
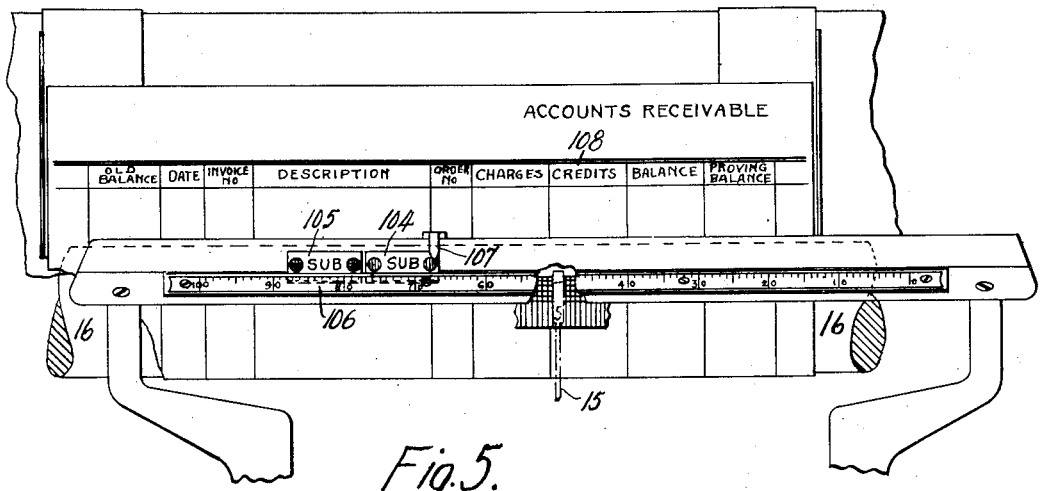
Fig. 5.
Inventor:
Adolph G Kupetz
by B.C. Stickney
Attorney Patented Mar. 3, 1931

1,794,464

UNITED STATES PATENT OFFICE

ADOLPH G. KUPETZ, OF BRONX, NEW YORK, ASSIGNOR, BY MESNE ASSIGNMENTS, TO ELLIOTT-FISHER COMPANY, OF NEW YORK, N. Y., A CORPORATION OF DELAWARE

COMBINED TYPEWRITING AND COMPUTING MACHINE

Continuation of application Serial No. 60,004, filed October 2, 1925. This application filed March 6, 1928. Serial No. 259,549.

This invention relates to typewriting machines, which include computing mechanism of the Underwood-Hanson type, and more specifically to means for controlling the state of the computing mechanism when the carriage is moved in either direction through a computing zone.

In machines of this type, computation is first set up on index-pins and then all the digits of the number set up are transferred to accumulator or register wheels for addition, or, if subtraction is to be accomplished, the complementary method is employed where the complements of the digits of the number are set up on the digit pins, and this complementary set-up is run into the register in the same direction as for addition, but registering a substractive effect.

The typewriter carriage determines the computing zone in which a computation in addition or subtraction is to take place. If the computation be one for subtraction, mechanism is shifted by the carriage movement to change the pin-setting mechanism for a complementary setting.

One feature of the present invention includes means to safeguard the operative and insure the shifting of the subtraction-setting mechanism at a subtraction zone. A subtraction tappet operates through an intermediate linkage to actuate an interlock which is common to all the numeral-keys. Thus, when the carriage moves into a subtraction zone, the numeral-keys are automatically locked, and before a computation can take place mechanism actuated by a subtraction-setting key must be released.

In machines of this type now in use, the movement of the carriage in letter-space direction automatically controls the state of the machine for either addition or subtraction, but such control is not effective during the return movement of the carriage, and as the subtraction-setting mechanism is restored by the general operator, each computation for subtraction automatically restores the mechanism for addition. And, hence, after a subtraction computation is completed, if the carriage is moved rightward to re-enter the subtraction zone, a computing mechanism is conditioned for addition and not for subtraction.

Another feature of the present invention provides for a subtraction-zone determining means which shall be effective to shift certain subtraction mechanism when the carriage enters a subtraction zone, regardless of the direction of the movement of the carriage, and making it impossible to print anything but a subtraction computation in this zone during the interval that the column area passes through the typing zone by locking the numeral-keys during this interval, and the locked-up keys can only be released by the manipulation of the subtraction-setting key.

When the state of the machine is for addition, the ribbon mechanism is in normal position for typing in black, and when substraction is required in a credit column, characters are usually typed in red. The shift of the two ribbon-fields may be effected automatically through the movement of the carriage on entering the subtraction zone or manually by the usual Underwood bichrome ribbon-shifting mechanism.

After computing in a credit column in red, the totalizer will show a "balance", and when this "balance" is typed in a "balance" column, a subtraction operation takes place to "clear" the registers, and it is desirable to type the "balance" in black. To type two adjoining subtraction computations, one in red and the other in black, results in more or less confusion in shifting the fields of the ribbon.

Another object of the present invention provides ribbon-color indicators for the individual column areas, which may be adjustably secured at the front of the machine over the keyboard to co-operate with the usual scale pointer mounted upon the carriage, and these indicators may be positioned to time with the passage of a column area through the printing position and carry visual means to indicate the color for the entry typed in a particular column area, and thus notify the operative at the scale and pointer position what particular color-field at the ribbon is to be employed in a column field, and who otherwise must watch the work-sheet for the column to enter the typing zone.

While automatic carriage-stop-actuated shifting means has been employed heretofore to automatically designate the color zone of the ribbon for a debit or credit entry, the employment of colored indicators, which cover a column area and indicate the state of the computing mechanism, provides that entries may readily be made in a credit column uniformly in red, and that other entries made in the "balance" column may be typed in black for a positive "balance" or be typed in red for a negative "balance", or in many other combinations, as the character of the work may require.

This is a continuation of my application, Serial No. 60,004, filed October 2, 1925.

Other features and advantages will hereinafter appear.

In the accompanying drawings,

Figure 1 is a sectional view through the Underwood-Hanson machine, with many of the parts omitted to bring out more definitely the elements which form the subject-matter of the present invention.

Figure 2 is a skeleton view, showing the several connections in operative relations to prevent the depression of the numeral-keys.

Figure 3 is a view similar to Figure 2, showing the subtraction-key depressed to condition the machine for a subtraction operation, which simultaneously releases the interlock to the numeral-keys.

Figure 4 is an enlarged skeleton view, looking from the rear of the machine, of a section of the tabulator stop-bar, a stop, a subtraction-setting trip-lever, and the connections from the latter to effect the locking of the numeral-keys.

Figure 5 is a front elevation, showing the front scale with the ribbon-indicators adjusted thereto and a section of the platen with a work-sheet form adjusted thereon, showing a series of items entered thereon in accordance with the present invention.

Numeral-keys 11 and alphabet-keys 12 depress key-levers 13 to swing bell-cranks 14, so as to swing type-bars 15 upwardly and rearwardly to strike the front face of a platen 16 mounted to rotate in a carriage 17. The carriage 17 has a step-by-step movement under the control of the keys 11 and 12 with the aid of the usual Underwood escapement mechanism, indicated at 18. The carriage 17 may also have a column-skipping movement under the control of the tabulating keys 19, which depress key-levers 20 that lift tabulating stop-bars 21 into the path of carriage-stops 22. These stops 22 may be selectively set at letter-space intervals on a rack-bar 23 carried by the carriage.

In addition to typing, the numeral-keys 11 also effect computing operations. For this purpose, each of the numeral-keys "1" to "9" is provided with a pendent stem 24 which is arranged to engage with an arm 25 on the associated one of the series of nine shafts 26. Each shaft 26 is connected to operate a parallel linkage 27 which will set a corresponding one of a series or nest of pins 28, according to the particular numeral-key actuated, and to the particular letter-space or digit-column in which it is actuated. To assist the numeral-key in this columnar selection, there is provided on the carriage 17 one or more denominational selectors 29, according to the number of computing zones employed. The denominational selectors 29 are adjustably spaced at letter-space intervals by means of a pair of rods 30 and 31, either or both of which may be racks with teeth at letter-space intervals.

Normally, the denominational selectors rest in a depressed position, but when the computing zone is reached, during the travel of the carriage, a zone-controller 32 forces, by means of its roller 33 engaging a conical roller 33$^a$, the denominational selector 29 of the zone timed to the printing position to raise a tappet 34 thereon into engagement with a series of jacks 35. The jacks, when engaged seriatim by the selectors 29, are vibrated to depress push rods 36 to operate transposition linkages 37 in a manner so that the order of operation of the jacks 35, which is from right to left, will be reversed, so that the linkages 37 will operate from left to right a series of denominational rack-bars 38 which carry the pins 28. Each of the bars 38 carries a row of nine pins 28, corresponding to the digits "1" to "9". Normally these pins 28 are out of register with the pin-setting linkages, but are brought into registry therewith when the particular digit column to which they correspond is being typed and computed in. Each denominational selector 29, through the jacks and the associated transposition linkages, advances the denominational rack-bars 38 individually just far enough to bring the pins 28 under the pin-setting linkages 27. This is more particularly described in the patent to Minton, No. 1,280,065, dated September 24, 1918.

The denominational bars 38 have formed at their forward ends racks 39 which drive gears 40, which, in turn, operate dial-wheels 42 of a computing head or totalizer which is positioned and arranged to exhibit the totals run thereon through a sight-opening 43 in the computer casing 44.

When the digits of the numbers typed are set up in the nest of pins 28 in this manner, they may be transferred or run into the totalizer by means of a general operator 45 which includes a cross-bar 46 arranged to engage, when driven forward, the particular pins 28 which have been depressed below the lower edge of the denominational bars into the plane of said bar 46, to drive said bar 46 distances predetermined by the set-up pins 28. The bars 38 are restored to their normal positions, and the set-up pins are restored by a pin-restoring mechanism 47, as set forth in the before-mentioned patent to Minton.

In the present invention, it is desirable to subtract as well as add. This is done by the complementary method, which consists in setting the pins 28 according to the complementary values of the keys actuated. This causes the dial-wheels 42 to be rotated on the forward movement of the general operator an amount complementary to the numeral-key actuated for each denomination, to which an extra unit may be added by the carrying mechanism on the return movement of the general operator.

To set for subtraction, there is provided a subtraction-setting bar 48. This bar is mounted to slide forwardly and rearwardly and is held in a forward position against the tension of a spring 49 by means of a latch 50 interlocking with a groove or notch 51 in the under edge of the bar 48. The subtraction bar sets all the "9" pins, so that any of the computing wheels which do not have digits computed in their denominations may be rotated nine points, which is the complement of "0". This is accomplished by said bar 48 operating connections to levers 52 connected to each "9" pin 28, which depresses said pins on the rearward movement of the subtraction bar and restores the pins when said bar is restored after a subtraction operation, as disclosed in said patent to Minton.

The subtraction-setting bar 48, when moved rearwardly by its spring 49, also shifts the shafts 26 so that they will become disconnected from the linkages 27 corresponding to the numeral-keys and become connected to linkages corresponding to the complementary values of the numeral-keys. The shifting of the rock-shafts 26 is accomplished by a bar 60 pivotally hung to be rocked about its upper edge at both ends and engaging notches 61 in each shaft 26. The bar 60 is rocked by a crank-arm 62, which in turn is vibrated by a bell-crank 63 which is connected to the subtraction bar 48 by a pin-and-slot connection 48ª.

The latch 50, which releases the subtraction bar 48, may be withdrawn by a key-control, as by a subtraction key 67 which has its rear end pivotally connected to the upper end of an arm 68 secured to a rock-shaft 69 which carries the latch 50.

To insure the release of the subtraction-setting bar 48, when a subtraction zone is reached, provision is made for locking the numeral-keys automatically, so that the operative will be forced to set for subtraction before further computing can take place. For this purpose, certain of the stops 22 located in the subtraction zone may be provided with a shoe or extension 70 of a length corresponding to the letter-space area of the computing zone. This extension 70 engages a dog 71 when the subtraction zone is reached. The dog 71 when depressed by the shoe 70 vibrates a lever 72 to draw on a link 73 connected at the lower end to a yoke 74 hung upon a fulcrum rod 75 stationary with the frame. The yoke includes an arm 76 having the upper end pivotally connected to a trip-member or draw-bar 77 supported at its free end by a guide-plate 78. This draw-bar 77 projects slightly beyond the guide to underlie the rear end of a lever 79 mounted to vibrate freely upon the rock-shaft 69, said lever being provided with an upright arm 80 movable therewith, to form a three-armed lever or trip-member, and a spring 81 which normally holds the rear end of the lever 79 spring pressed against the projecting end of the bar. The construction is such that when the shoe 70 engages with the dog 71 it withdraws the bar 77 from its position under the end of the lever 79 and allows the spring 81 to vibrate the lever to a stop position where the forward end 79ª strikes a cross-rod 82; the duration of the interval that the bar 77 is held withdrawn is predetermined by the length of the shoe 70 and the length of the shoe is governed by the letter-space area of the subtraction column.

The upper end of the arm 80 is pivotally connected to a horizontally-disposed link 83 which passes over the linkage elements 27, where the free end is pivotally connected to a crank-arm 84 secured to a rock-shaft 85 to vibrate a dog 86 which operates to fill a gap in a series of pendent cam-plates 87, and thus prevent a pendent arm 88 from passing downwardly between said cam-plates and checking the down stroke of any numeral-key before its stem 24 can reach the crank-arm 25. This key-locking means is disclosed more fully in the patent to Hart, No. 1,339,704, dated May 11, 1920.

When the trip-lever 72 is vibrated by the subtraction-setting shoe 70, the lever 79 and crank-arm 80 are released to the action of the spring 81, which vibrates the two parts above the rock-shaft 69 from the position of Figure 1 to that of Figure 2, when the link 83 has rocked the shaft 85 and raised the dog 86 into operative position to prevent depression of any numeral-key 11. This action takes place automatically during the movement of the carriage in a letter-space direction, when the carriage enters a subtraction zone. To release the interlocking dog 86 and permit the depression of a numeral-key to type within the subtraction zone, a depression of the subtraction-key 67 is required to release the subtraction-setting bar 48 to the action of the spring 49, as previously described, and the rocking of the shaft 69 will vibrate a crank-arm 90, which, in turn, will vibrate a motion-reversing lever 91 pivoted to the frame in such a manner that the upper arm 92 thereof will bear against a stud 93 secured to the upper end of the arm 80, to rock said arm 80 in a direction reverse to the rocking of the shaft 69, as shown at Figure 4. The part to which said lever 91 is pivoted is a bracket 91ª, which in turn is screwed upon a standard part of the machine which generally serves to guide the denominational rack-bars 38. Said stud 93 projects from one side of the arm 80 to the plane of the link 83, where said link is pivotally mounted upon a screw 94 threaded into the end of the stud. The stud 93 on the opposite side of the arm 80 is formed with a groove to receive one end of the spring 81. The vibration of the lever 91 by the crank-arm 90, and through the arm 92 bearing against the stud 93, vibrates the link 83 in the direction of the arrow, Figure 2, to rock the shaft 85 and withdraws the dog 86 from the pendent cams 87, as shown at Figure 3, and simultaneously with the release of the interlock for the numeral-keys the rocking of the arm 80 will swing the lever 79 back to normal position. When the bar 48 is released to the spring 49 and is drawn rearwardly, the notch 51 will move away from the latch 50, and the action of a spring 95 which tends to restore the several parts is checked by said latch 50 bearing against the lower edge of the bar 48, as shown at Figure 3.

From this description, it will be noted that the subtraction-stop 22ª operates to lock the numeral keys at the initial entry of the carriage into a subtraction zone, but there are other instances where it is also necessary to prevent the numeral-keys from typing, and this preventive means includes moving the dog 86 to fill the gap in the series of pendent cams, as already described. One of such instances might be mentioned as when the carriage moves through a column area, and it is necessary to lock the numeral-keys at the decimal position, or at a position between hundredths and thousandths, or at a position between hundred thousandths and millions, etc., to force the operative to observe the usual denominational divisions of the number, either by typing a punctuation mark or depressing the space-bar, and which operation automatically releases the numeral-key-lock by withdrawing the dog 86 through a connection to the link 83, as shown in the above-mentioned Hart patent.

To provide for a releasing movement of the link 83, independent of the control forming the subject-matter of the present invention, the end of the link 83 is formed with a slot 96 where it engages with the pivot-screw 94 at the upper end of the arm 80, and, as shown in the drawings, the normal position of the said pivot-screw is against the rear wall of the slot, and a light spring 97 secured to the link 83 will hold said screw 94 in the position of Figure 1. This provision for a numeral-key-lock independent of the subtraction-control described enables the locking means to be employed in a variety of transactions where fool-proof preventive measures are essential.

The subtraction-bar 48 is restored to its normal position by means of the cross-bar 46 of the general operator engaging with a lug 98 thereon, when the general operator is actuated to run up the subtraction computation set up in the nest of pins 28, and the numeral-key-locking mechanism is restored to normal to be brought into action in a subsequent subtraction zone.

The operation of the general operator 45 may be accomplished manually at the end of each computing zone by the usual hand-lever 99, or by a motor-drive 100 controlled by a key 101 in the well-known Underwood-Hanson manner.

Heretofore, it has been the practice to provide the lever 72 with a one-way trip-pawl, which is operative in a leftward direction to set the machine for a subtraction state, and during the return movement of the carriage the trip is idly vibrated to pass under the shoe 70 of the stop 22ª.

As the machine is automatically restored to a state for addition at the end of each subtraction computation, and an additive state prevails during the entire movement of the carriage towards the right, it is obvious that should the carriage be shifted rightward to have a subtraction column re-enter the typing zone for a correction or any other purpose, any typing operation in the subtraction column would be conditioned for addition; and hence the usual procedure is to move the carriage rightward and then shift it to the left and have the subtraction column re-enter the typing zone by a leftward movement. Such an operation takes time and is not always understood, as the operative is accustomed to shift the carriage rightward to correct an error in ordinary typing.

Instead of employing a one-way trip-pawl on the lever 72, the pawl becomes the dog 71 which is permanently fixed to the lever 72, and it is obvious that the shoe 70, movable to and fro with the carriage, will swing the lever 72 to lock the numeral-keys, regardless of the direction of the carriage movement, and the carriage may be shifted rightward after a subtraction column has passed through the typing zone to re-enter said zone and automatically lock the keys preparatory to restoring the subtraction state of the machine during the interval the dog 71 engages the shoe 70 of the subtraction stop.

In some forms of commercial accounts, as, for example, in typing statement and ledger postings, the numerals are typed in colors descriptive of the form of computation. In one form of such work an old balance is first typed and run into the machine. If the first item entered is a "debit" it is typed in black in the debit column and run additively into the totalizer. If the item is a "credit" it is typed in red in the credit column and run into the totalizer subtractively. The balance shown after entering the item is then typed in the balance column and run into the totalizer subtractively to clear the machine or totalizer. Usually this balance is a debit balance subtracted out of the machine, but it is desirable at times to print the same in black. Sometimes the balance typed is a credit balance, which must be run additively into the machine to clear the totalizer, and it is desirable in this state to type the credit balance in red in the balance column.

The automatic shifting of the ribbon fields may be accomplished in a manner shown in my prior Patent, No. 1,356,072, dated October 19, 1920, where stops carried by the carriage operate connections 102 to condition the ribbon-vibrating means to throw either ribbon field to the printing position, and where a ribbon-field setting predetermined by the stop may be changed from black to red or red to black by the use of the usual Underwood ribbon-shift key 103, shown at Figure 1, which manually controls the throw of the ribbon-vibrator 103ª.

To enable the operative to readily distinguish the state of the ribbon field in a debit or credit column position before any typing action takes place, indicator plates 104 and 105 are adjustably secured to the machine frame by sliding their lower edges under the carriage scale 106 and having upright visual sections which are descriptive of the computing state and the ribbon field state at a column position. The plate 104 indicates a subtraction state and a red ribbon field, while the plate 105 indicates a subtraction state and a black ribbon field.

These plates may be adjusted to a carriage-scale position which is determined by the platen-scale reading of the column area, and preferably have a letter-space area equal to the letter-space area of the associated column, and the operative, by watching the usual Underwood scale pointer 107, will immediately see that in the credit column 108 the state of the computing element is for subtraction and the state of the ribbon field is for typing in red. When the pointer 107 moves to the position of the plate 105, it indicates that the computation is still one of subtraction, but the ribbon field state is set for typing in black. Either of these automatically-set states of the ribbon field may be reversed by depressing one of the keys 103 and holding it depressed during the typing of the item in the column without disturbing the setting of the ribbon-control stops on the carriage-rack.

From this description it will be noted that means are provided to lock the numeral-keys at the entrance of a subtraction column into the printing zone of the types; that this locking action is operable at any scale position along the line of printing predetermined by a column-stop setting; that the locked-up numeral-keys are released by the subtraction-setting key which simultaneously conditions the computing mechanism for a subtraction operation; that the numeral-key-locking means though operative by the column-stop control may also be operated independently by other controls, as for the purpose of locking the keys for punctuation, etc.; that the key-locking means is operable by the movement of the carriage in either direction through a computing zone; that the subtraction-locking means becomes operative automatically during the course of jumping the carriage from one computing zone to another in a letter-feed direction; that as the subtraction zone passes out of the printing field the computing mechanism is automatically restored to an unlocked additive state; and that a subtraction zone that has passed through the printing position leftward and unlocks the computing mechanism for addition may re-enter the printing position rightward and recondition the computing mechanism for a subtraction computation.

It will be further noted that visual means are adjusted to the carriage-scale and cooperate with the usual pointer which is movable with the carriage to define a columnar letter-space area at the scale position; and that this visual means may be adjusted to any predetermined columnar position along the line of printing and be provided with distinguishing marks to indicate the state of the computing mechanism whether for subtraction or addition, and also indicate the appropriate color descriptive of a debit or credit computation within a column area.

Variations may be resorted to within the scope of the invention, and portions of the improvements may be used without others.

Having thus described my invention, I claim:

1. In a combined typewriting and computing machine having numeral-keys operatively connected with the computing mechanism which is settable from normal state of addition to subtraction state of the machine and having manually-operable subtraction-setting means, normally carriage-controlled means effective to lock the numeral-keys when the carriage enters a subtraction-zone, said means including a lever fulcrumed upon the machine and spring urged, so as to cause one end of the lever to normally rest upon a carriage-controlled trip-member, a pivoted key-locking member, a link to operatively connect the opposite end of said lever with said key-locking member, pivot-and-slot connection being provided between the lever and the link, so as to allow the key-locking member to be actuated independently of said carriage-controlled trip-member, and light spring means counteracting the spring-pressure upon said lever, so as to hold the pivot in normal operative relation in one end of the slot, and means actuated through the manually-operated subtraction-setting means, to restore said lever and its associated key-locking member to ineffective home position.

2. In a combined typewriting and computing machine including a carriage, numeral printing keys having means to operate the computing mechanism, a spring-urged train of mechanism effective to lock the numeral-keys, a trip-member normally effective to restrain the key-locking train of mechanism, and means on the carriage effective to withdraw the trip-member and release the key-locking means when the carriage enters a computing zone, the combination with a subtraction-setting mechanism manually operable after the carriage has entered the computing zone to set the computing mechanism for subtraction, including a key-rocked shaft, of means co-operative with the setting of the subtraction-mechanism within the computing zone and effective to restore the carriage-released trip-member and restore and again restrain the key-locking train to release the carriage-locked keys, said co-operative means including an arm on said rock-shaft, a lever on the frame vibrated by the rocking arm to restore the carriage-released trip-member and a spring to urge the train of key-locking mechanism in a key-releasing direction.

3. In a combined typewriting and computing machine including a carriage, numeral printing keys having means to operate the computing mechanism, a train of mechanism effective to lock and unlock the numeral-keys, a trip-member normally effective to restrain the key-locking train of mechanism, and means on the carriage effective to withdraw the trip-member and release the key-locking train when the carriage enters a computing zone, the combination with a subtraction-setting mechanism manually operable after the carriage has entered the computing zone to set the computing mechanism for subtraction, including a key-rocked shaft, of means co-operative with the setting of the subtraction-mechanism within the computing zone and effective to restore the carriage-released trip-member and restore and again restrain the key-locking train to release the carriage-locked keys, said co-operative means including a bell-crank lever fulcrumed upon said rock-shaft, a spring to urge one arm of said bell-crank lever in a key-locking direction to normally rest upon said trip-member and the other arm of said bell-crank lever connected to control the train of key-locking mechanism, including a link and a key-locking member, and a spring connected to the link to actuate the key-locking member in a key-releasing direction.

4. In a combined typewriting and computing machine including a carriage, numeral printing keys having means to operate the computing mechanism, a train of mechanism effective to lock and unlock the numeral-keys, a trip-member normally effective to restrain the key-locking train of mechanism, and means on the carriage effective to withdraw the trip-member and release the key-locking train when the carriage enters a computing zone, the combination with a subtraction, setting mechanism manually operable after the carriage has entered the computing zone to set the computing mechanism for subtraction, including a key-rocked shaft, of means co-operative with the setting of the subtraction-mechanism within the computing zone and effective to restore the carriage-released trip-member, and restore and again restrain the key-locking train to release the carriage-locked keys, said co-operative means including a bell-crank lever fulcrumed upon said rockshaft, a spring to urge one arm of said bell-crank lever in a key-locking direction to normally rest upon said trip-member and the other arm of said bell-crank lever connected to control the train of key-locking mechanism, including a link and a key-locking member, and a spring connected to the link to actuate the key-locking member in a key-releasing direction, said cooperative means also including an arm on said rock-shaft and a lever on the frame vibrated by the rocking arm to restore the carriage-released trip-member against its key-locking tension and release the key-locking train of mechanism to its key-releasing spring.

5. In a combined typewriting and computing machine including a carriage, numeral printing keys having means to operate the computing mechanism, a train of mechanism effective to lock and unlock the numeral-keys, a trip-member normally effective to restrain the key-locking train of mechanism and means on the carriage effective to withdraw the trip-member and release the key-locking train when the carriage enters a computing zone, the combination with a subtraction-setting mechanism manually operable after the carriage has entered the computing zone to set the computing mechanism for subtraction, including a key-rocked shaft, of means co-operative with the setting of the subtraction-mechanism within the computing zone and effective to restore the carriage-released trip-member, and restore and again restrain the key-locking train to release the carriage-locked keys, said cooperative means including a lever fulcrumed upon said rock-shaft, a key-locking spring to cause one arm of said lever to be restrained by the carriage-controlled trip-member, the other arm of said lever having a one-way connection with the key-locking train of mechanism, and a key-releasing spring to control said key-locking train of mechanism while the key-locking spring is restrained by said trip-member.

6. In a combined typewriting and computing machine including a carriage, numeral printing keys having means to operate the computing mechanism, a train of mechanism effective to lock and unlock the numeral-keys, a trip-member normally effective to restrain the key-locking train of mechanism, and means on the carriage effective to withdraw the trip-member and release the key-locking train when the carriage enters a computing zone, the combination with a subtraction-setting mechanism manually operable after the carriage has entered the computing zone to set the computing mechanism for subtraction, including a key-rocked shaft, of means co-operative with the setting of the subtraction-mechanism within the computing zone and effective to restore the carriage-released trip-member, and restore and again restrain the key-locking train to release the carriage-locked keys, said co-operative means including a lever fulcrumed upon said rock-shaft, a key-locking spring to cause one arm of said lever to be restrained by the carriage-tripped member, the other arm of said lever having a connection with said key-locking train of mechanism, said key-locking train including a link, a key-locking member and a key-releasing spring, a lever of the first order pivoted on the machine, and an arm rockable with said shaft to vibrate said last lever to render said key-locking train of mechanism effective to respond to the key-releasing spring.

7. In a combined typewriting and computing machine including a carriage, numeral printing keys having means to operate the computing mechanism, a train of mechanism effective to lock and unlock the numeral-keys, a trip member normally effective to restrain the key-locking train of mechanism, and means on the carriage effective to withdraw the trip-member and release the key-locking train when the carriage enters a computing zone, the combination with a subtraction-setting mechanism manually operable after the carriage has entered the computing zone to set the computing mechanism for subtraction, including a key-rocked shaft, of means co-operative with the setting of the subtraction-mechanism within the computing zone and effective to restore the carriage-released trip-member, and restore and again restrain the key-locking train to release the carriage-locked keys, said co-operative means including a lever loosely mounted upon said rock-shaft, a stud upon one arm of said lever, a key-locking spring connected to said stud to urge another arm of said lever to rest upon said carriage-controlled trip-member, said key-locking train of mechanism including a link connected to said stud, a key-locking member connected with said link and a key-releasing spring, said key-releasing spring becoming effective after the key-locking spring is restrained by said trip-member.

8. In a combined typewriting and computing machine including a carriage, numeral printing keys having means to operate the computing mechanism, a train of mechanism effective to lock and unlock the numeral-keys, a trip member normally effective to restrain the key-locking train of mechanism, and means on the carriage effective to withdraw the trip-member and release the key-locking train when the carriage enters a computing zone, the combination with a subtraction-setting mechanism manually operable after the carriage has entered the computing zone to set the computing mechanism for subtraction, including a key-rocked shaft, of means cooperative with the setting of the subtraction-mechanism within the computing zone and effective to restore the carriage-released trip-member, and restore and again restrain the key-locking train to release the carriage-locked keys, said co-operative means including a lever loosely mounted upon said rock-shaft, a stud upon one arm of said lever, a key-locking spring connected to said stud to force another arm of said lever to be restrained by said carriage-controlled trip-lever, an arm rockable with said shaft, a lever pivoted on the machine to be vibrated by said rocking arm, said last lever engaging said stud to restore the carriage-released key-locking train of mechanism to release the locked keys, said key-locking train of mechanism including a link connected with said stud, a key-locking member vibrated by said link and a key-releasing spring connected with said link, said key-releasing spring becoming effective after the key-locking spring is restrained by said trip-member.

ADOLPH G. KUPETZ.